Nov. 7, 1933.      F. L. TARLETON      1,934,605
REFRIGERATING APPARATUS
Filed Oct. 6, 1931       3 Sheets-Sheet 1

WITNESSES:

INVENTOR
Frederic L. Tarleton.
BY
William J. Swezey
ATTORNEY

Nov. 7, 1933.   F. L. TARLETON   1,934,605
REFRIGERATING APPARATUS
Filed Oct. 6, 1931   3 Sheets-Sheet 2

WITNESSES:

INVENTOR
Frederic L. Tarleton.
BY
William H. Swezey
ATTORNEY

Nov. 7, 1933.　　　F. L. TARLETON　　　1,934,605
REFRIGERATING APPARATUS
Filed Oct. 6, 1931　　　3 Sheets-Sheet 3
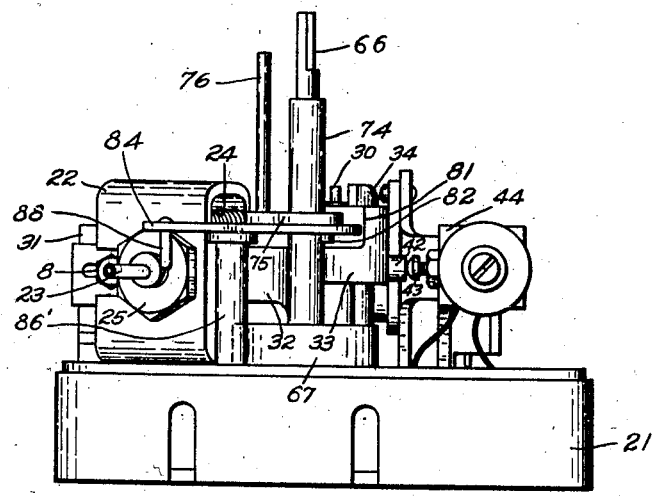
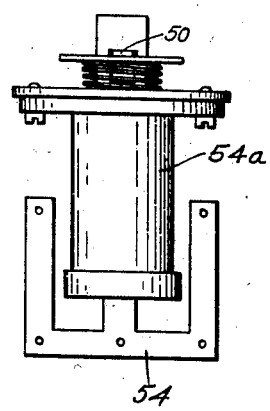
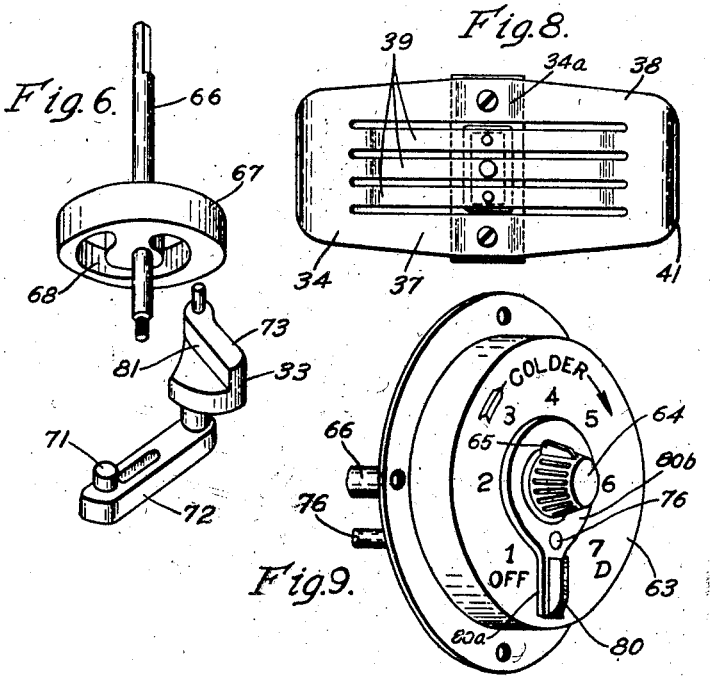
WITNESSES:
INVENTOR
Frederic L. Tarleton.
BY
William J. Swezey
ATTORNEY Patented Nov. 7, 1933

1,934,605

UNITED STATES PATENT OFFICE 1,934,605

REFRIGERATING APPARATUS

Frederic L. Tarleton, Springfield, Mass., assignor to Westinghouse Electric & Manufacturing Company, a corporation of Pennsylvania Application October 6, 1931. Serial No. 567,193

13 Claims. (Cl. 200—83)

The invention relates to refrigerating apparatus, and particularly to the control mechanism for such apparatus.

In mechanical refrigerators of the compression type, the compressor on starting must overcome the pressure on the condensing side of the refrigerating system. In refrigerating apparatus of the type having a sealed casing for the motor and compressor a separate fan motor must be provided on the outside of the casing for cooling the condenser, since a shaft for a fan extending through the casing cannot be effectively sealed. To give the motor sufficient torque at starting and to also start the fan motor, two split phase motors having their starting and running winding in parallel are sometimes used. The starting windings are cut out when the motors come up to speed. It is advantageous to have the motor control switch and the mechanism for placing the starting windings in the motor circuit and for taking them out again mounted on the same panel for reasons of compactness and accessibility.

The starting switch for the motor of the refrigerator is made responsive to the temperature of the cooling unit or the refrigerator compartment or both, so that the machine will operate when the temperature rises to a predetermined point and will stop as soon as a predetermined low temperature is again reached. It is also desirable to provide a manually operable means for disconnecting the motor when the machine is not to be used for considerable periods of time as well as a means for permitting adjustment of the temperature responsive control to maintain temperatures other than those desired for normal operation, as for example when ice is to be quickly frozen, in which event a lower evaporator temperature is required, or when the cabinet is used less than the usual amount in which case the control may be set to maintain a higher average temperature than normally required.

It is also desirable for a refrigerator motor to be restored automatically to the control of the temperature responsive device after a manually-initiated defrosting cycle has ended. In other words, when a refrigerator has been shut off for defrosting and the temperature of the cooling unit or evaporator reaches a point somewhat above 32° F., so that the frost has melted, it should automatically be returned again to operation so that food contained in the cabinet will not spoil.

In accordance with my invention, I provide a member which is movable in response to cooling unit temperature together with a switch operated by the member to control cycling of the refrigerating system, means being interposed between the switch and the member operated in response to temperature so that both opening and closing movements of the switch may be advanced or retarded simultaneously with respect to movement of the temperature responsive member, whereby the refrigerator temperature may be raised or lowered merely by adjustment of the interposed operating means. The entire temperature differential is thereby moved. The use of additional loading or biasing devices in connection with the temperature responsive member is avoided. A variation in timing is thereby obtained in the operation of the switch with respect to the movement of the temperature responsive member since the opening and closing amplitude of the temperature responsive member is changed to open and close the switch.

My improved controlling mechanism also includes features which are effective to prevent closure of the switch and to prevent opening of the switch.

It is an object of the invention, therefore, to provide a control mechanism for a mechanical refrigerator which embodies within a relatively small space a means for starting and stopping the machine in response to temperature changes of the cabinet or cooling unit.

Another object of the invention is to provide means for varying the operation of temperature responsive means to change the temperature limits within which the machine operates.

A still further object of the invention is to provide a simple and effective means cooperating with the temperature responsive means for automatically restarting the compressor and restoring it to the control of the temperature responsive device at the completion of a manually initiated defrosting cycle.

Further objects and advantages of the invention will be apparent from the following description and accompanying drawings wherein:

Fig. 5 is an end elevational view looking to the left of Fig. 3;

Fig. 6 is an exploded perspective view showing constructional details of the temperature adjusting mechanism;

Fig. 7 is a plan view of the electro-magnetic device for controlling the starting windings of the motors;

Fig. 8 is a plan view of the main switch plate;

Fig. 9 is a perspective view of the control dial and the rod leading to the control box.

Figure 1:
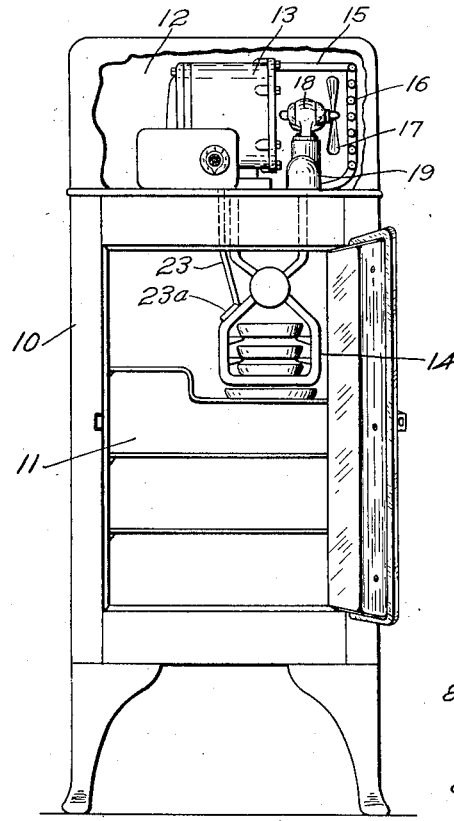
Figure 1 is a front elevational view of a refrigerator cabinet provided with control mechanism embodying the invention.
Figure 10:
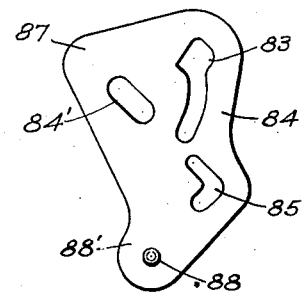
Fig. 10 is a plan view of the defrosting plate.

Referring specifically to Fig. 1, 10 designates a refrigeration cabinet provided with a food compartment 11 and a machine compartment 12. A hermetically sealed motor compressor unit 13 is located in the compartment 12. Expanded refrigerant drawn from the evaporator 14 located in the food chamber 11 is compressed in the unit 13 and is forced through the conduit 15 into the condenser 16, where the gas is cooled and liquefied, assisted by a draft of air created by a fan 17 driven by a separate motor 18. The flow of condensed refrigerant from the condenser to the evaporator is controlled by a float valve mechanism 19. The operation of the motor compressor unit is controlled by a mechanism responsive to the temperature changes in the evaporator or the cooling chamber, or both.

Referring to Figs. 3 to 10 inclusive for a detailed description of the temperature responsive control, 21 designates a substantially rectangular base upon which the various control elements are mounted. This base is preferably made of an insulating material, such as a phenolic condensate product. Fastened to the base 21 is a frame 22 supporting a sylphon bellows 24. This bellows is connected with a conduit 23 leading to a bulb 23a (Fig. 1) placed adjacent the evaporator 14 or in the food compartment 11. The bellows, conduit and bulb are filled with an expansible gaseous medium such as sulphur dioxide or methyl chloride. The bellows 24 expands due to gas in the thermostatic bulb expanding, and will, therefore, tend to move one of its ends outwardly as the other end is fixed to the frame 22 by the nuts 25 screwed on threads 26 on the conduit 23. Attached to the free end of the bellows 24 is a rod 27 which presses against one arm 28a of bell crank lever 28. This lever is pivoted on a pin 9 attached to the base 21.

Expansion of the bellows rotates the lever 28 in a clockwise direction. In opposition to the pressure of the bellows 24 is the biasing force exerted by a spring 29 pressing against the arm 28a and attached to the base by means of member 31 having the rod 8 attached thereto. The position of the nuts 22 on the bellows 24, together with the force exerted by the spring 29, provides an adjustable factory adjustment. The other arm 32 of the lever 28 bears on a generally wedge shaped piece of insulating material 33. This material 33 contacts with a switch plate 34, the details of which are shown in Fig. 8. The operation of this switch plate is fully disclosed in Patent No. 1,669,531, issued to August Mottlau, and a brief description of its operation will, therefore, suffice.

One end of the switch plate 34 is held in a fixed position by an L-shaped member 35 having an adjusting screw 36 which may be locked in place by a nut 36a. The other end 41 of the plate 34 is free to move but is in contact with a movable wedge-shaped piece 33. The switch plate 34 has a U-shaped depression 34a in the two outer strips 37 and 38, while the three inner bridge members 39 are slightly raised. This construction effects the depression of the bridge members 39 in the middle when the free end 41 of the plate 34 is raised. When it is lowered, the bridge members 39 will snap upward due to the inherent resiliency of the metal strips. A snap action is imparted to the bridge members 39 when the free end 41 of the plate 34 is either raised or lowered. This type of switch is commonly called a "grasshopper" switch. A contactor button 42 is attached to the bridge members 39 by any desired means and a coacting contactor button 43 is held by the protruding member 44 which is fastened to the base 21.

When the bellows 24 expands due to a rise in temperature in the cooling chamber or evaporator, the rod 27 moves the lever 28 clockwise as soon as the gas pressure in the bellows 24 overcomes the resisting pressure of the spring 29. The spring 29 is utilized to ensure the return of the lever 28 when the gas in the bellows 24 again contracts. Assuming the member 33 to be in a raised position, and the contactor 42, therefore, not engaging the contactor 43, since the bridge 39 is depressed, when the rod 27 moves the lever 28, the arm 32 is dropped, thus allowing the member 33 which is mounted pivotally on the base 21 by pin 30, to rotate in a clockwise direction about the pivot. This in turn allows the free end 41 of the switch plate 34 to drop, and the bridge portions 39 will, therefore, snap upwardly and contactors 42 and 43 will engage, thus closing the motor circuit. This is the position shown in Fig. 3.

When the gas in the thermostatic bulb contracts due to a lower temperature in the cooling unit 14, the bellows 24 contracts until the spring 29 rotates the lever 28 in a counter-clockwise direction, thus raising the arm 32 and the member 33, which pushes the end 41 of the switch plate 34 upwardly until the bridge 39 snaps downwardly and breaks the motor circuit through the contacts 42 and 43.

Figure 2:
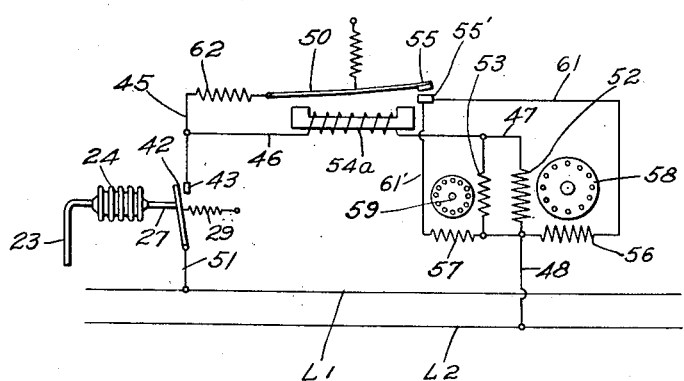
Fig. 2 is a diagrammatic view illustrating the main control circuit for the compressor and fan motors of a mechanical refrigerating apparatus of the hermetically sealed type.

Referring to Fig. 2 the compressor and fan motors are shown having their starting and running windings connected in parallel, and controlled by a solenoid operated relay. A sylphon bellows responsive to temperature is shown to operate the main switch contacts 42 and 43. As soon as the motor circuit is closed by the contactors 42 and 43, current will pass from line conductor L1, through conductors 51, contacts 42, 43, conductor 46, coil 54a, conductor 47, main windings 52 and 53 which are connected in parallel and conductor 48 to line conductor L2. The initial surge of current through the running windings energizes the magnet coil 54a sufficiently to cause it to draw up the core 54 thereby closing the contacts 55 and 55'. The contact 55 is carried on the pivoted arm 50 which acts as a conductor. The starting windings 56 and 57 for the compressor motor 58 and the fan motor 59, respectively, which windings are connected in parallel, are supplied with current from line conductor L1 through conductor 51, contacts 42 and 43, conductor 45, resistor 62, arm 50, contacts 55 and 55', then through the two starting windings 56 and 57 which are connected in parallel by conductors 61 and 61', and from these windings through conductor 48 to line conductor L2.

As soon as the motors come up to speed the current drawn by the running windings 52 and 53 decreases, and magnetic flux in the coil 54a thereby is reduced in flux until the core 54 drops downwardly, thus opening the contacts 55 and 55' and deenergizing the starting windings 56 and 57. The running windings remain energized and the motors will continue to operate until the contactors 42 and 43 are opened by the action of the temperature responsive switch 34. The general operation of the motor starting system is fully described in the patent of Matson C. Terry No. 1,814,013 for Refrigerators.

The foregoing description covers the operation of the motors and control for maintaining one set of temperature conditions in the cooling unit of a refrigerating apparatus. The invention contemplates in addition an adjustable means for enabling the user to vary the temperature limits in the cooling compartment or evaporator to obtain different average temperatures. Means are also provided to permit turning the machine off permanently, and to permit a manually initiated defrosting cycle, at the conclusion of which the machine is automatically restored to the control of the temperature responsive device. However, the control mechanism is so constructed that these operations will take place in exactly the same manner after certain other operations have been performed regardless of the pre-setting of certain manually adjustable features.

As before stated, it is desirable to provide a means for varying the average temperature to be maintained, which when operated manually, will function to attain that temperature automatically and maintain the same average temperature until a different one is selected. This adjustment is commonly called a "customer's adjustment". The grasshopper switch 34, in conjunction with a simple mechanical means, is peculiarly adapted to controlling the average temperature of the cooling compartment as desired. A dial 63 as shown in Fig. 9 marked with numbers or letters or both, is provided for the user. This dial is provided with a knob 64 and a pointer 65 mounted on the rod 66, so that by turning the knob 64 the rod 66 is also turned.

Adjustment of the operating position of the switch 34 to obtain different average evaporator temperatures is obtained by raising or lowering the free end of this switch by means of the wedge shaped piece 33. In order to accomplish this result it is necessary to move the piece 33 horizontally. One means for obtaining this movement is as follows: When the knob 64 is rotated, the rod 66 connected to a roller 67, shown in detail in Fig. 6, is also rotated, thereby rotating the roller 67. In the roller 67 is an eccentric groove 68 which engages a pin 71 formed integral with an arm 72. The arm 72 is pivotally attached to the wedge-shaped member 33 and when the roller 67 is rotated, the pin 71 is moved forward and backward by the eccentric groove 68, thus moving the member 33 forward or backward. Since an angular surface 73 of the member 33 supports the end 41 of the grasshopper switch 34, the end 41 will be raised or lowered as the member 33 slides toward or away from it.

Assume the contact members 42 and 43 to be opened and the wedge-shaped piece 33 to be moved so that the free end 41 of the grasshopper switch 34 is in its lowest position. A relatively slight expansion of the bellows 24 in response to an increase in the evaporator temperature will rotate the bell crank lever 28 clockwise an amount sufficient to cause the arm 32 to release the wedge-shaped member 33 which in turn moves clockwise, whereupon the inherent resiliency of the grasshopper switch causes the contacts 42 and 43 to engage and permit the motors to start. The compressor operates until the evaporator temperature has been reduced sufficiently to allow the spring 29 to overcome the pressure within the bellows and rotate the bell-crank 28 counter-clockwise, far enough to raise the end 41 to the point at which the inherent resiliency of the grasshopper switch causes the contacts 42 and 43 to separate with a snap action. When the wedge member is in the position just described, that is outwardly, the lowest evaporator temperatures are produced because of the relatively slight amount the bellows 24 must expand to cause the switch contacts to close.

Figure 3:
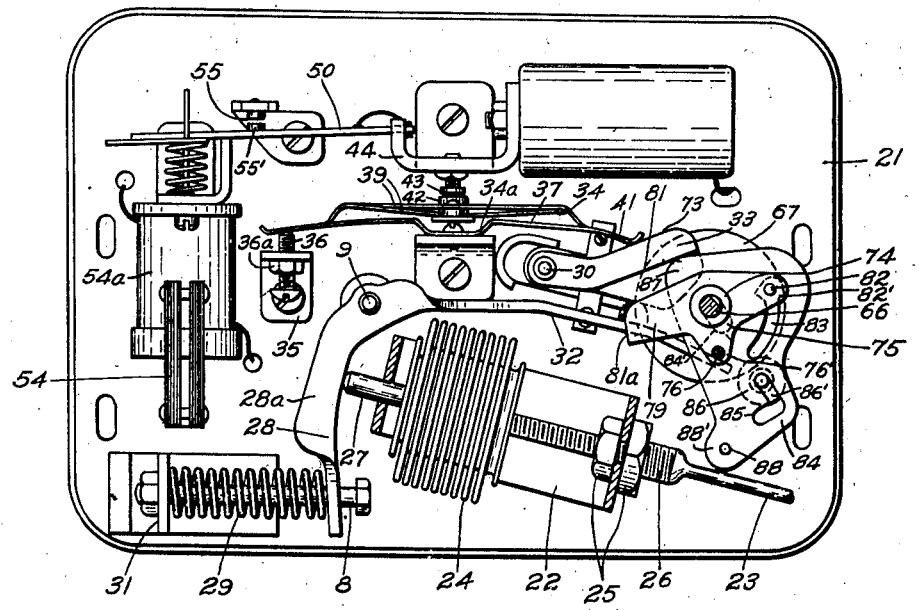
Fig. 3 is a plan view of the control mechanism with the main switch closed.
Figure 4:
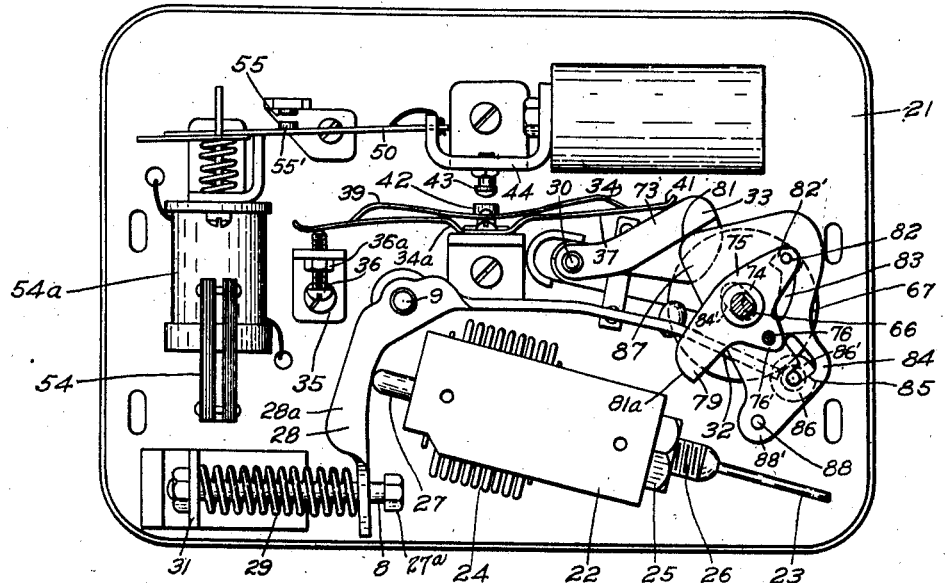
Fig. 4 is a view similar to Fig. 3 but showing the mechanism in the defrosting position.

The upper contact 43, as shown in Figs. 3 and 4, has a threaded connection with respect to the supporting bar 44, this connection providing for upward and downward adjustment of the upper contact so as to secure variation in the extent of angular movement of the switch operating portion of the grasshopper member between closed and opened positions of the switch contacts and therefore variation in the temperature range between opening and closing positions of the switch.

The stop 27a provided by the head of the bolt 8, is so positioned that when the indicator knob 64 is turned to the number 1 position on the dial 63, the wedge 33 will be at its outward extremity and the arm 28a will be engaged by the stop 27a before the arm 32 of the bell crank lever 28 has rotated counter-clockwise far enough to raise the wedge and the end of the switch plate. The machine will, therefore, run constantly regardless of evaporator temperature and will continue to do so until the wedge is set to correspond to number 2 or a higher dial setting. Thereby "quick freezing" is obtained.

The number 2 position of the indicator is the first one that will allow the machine to run intermittently in response to the evaporator temperature as the grasshopper switch 34 will be opened before the arm 28 reaches the stop 27a.

As the wedge member 33 is moved inwardly by rotating the knob 64 and shaft 66 counter-clockwise the free end 41 of the grasshopper switch is progressively raised. As a result of this action the bellows 24 need not contract as far as when the wedge is in its outermost position, in order to permit the lever arm 32 to raise the free end of the grasshopper switch so as to cause separation of the contacts 42 and 43. It will be seen that by raising and lowering the wedge member 33, the temperature differential is raised and lowered since the temperatures at which the switch 34 opens and closes are raised and lowered simultaneously due to the variation of the range of movement of the switch end 41 with respect to the bell crank lever 28.

It is apparent, however, that the bell-crank lever 28 is merely a transmission device for translating the motion of the bellows 24 to a switch operating or actuating member, for example switch end 41, and that various other transmitting means may be employed. The essential features of the control are a switch operating member, such as the switch end 41, which opens and closes the switch 34 in response to expansion and contraction of a temperature-responsive means, for example, the bellows 24 through suitable transmission mechanism, and a variable spacing means, such as wedge member 33 coacts with the switch operating member, to vary the angular position thereof with respect to the transmission device, whereby the established temperature differential is moved up or down as an entirety with little or no effect upon the characteristic action of the biasing means, such as spring 29.

It is sometimes desirable or necessary to entirely shut off the machine so that it will not operate under any condition. According to this invention the grasshopper switch 34 is maintained in circuit breaking position by locking the free end 41 of the grasshopper switch 34 in a raised position, thus keeping the bridge 39 in a depressed state. The member 33 is supported in such a manner that the dropping of the arm 32 when the bellows 24 expands will not permit the grasshopper switch 34 or member 33 to drop. It is obvious that the motors will, therefore, not be energized.

To hold the member 33 permanently in a raised position, the wing portion 79 of a cam member 75 is rotated in a clockwise direction until it presses against the under surface 81 of member 33 and is held permanently in position by the following means:

The cam member 75 is provided with an extending wing 79. A hollow shaft 74 extends at right angles to the approximate center of the cam member. This shaft is mounted on and rotates about the temperature-selector shaft 66. The cam is rotated by a rod 76 extending parallel to the shaft 74 and rigidly fastened to a depending portion 76' of the cam member 75.

When it is desired to disconnect the motors from the main circuit, the rod 76 is moved in a clockwise direction by the handle 80 which is mounted on an extension 80a of a disc 80b. The disc 80b rotates freely on the shaft 66 between the temperature selector knob 64 and the indicator plate 63.

The movement of the rod 76 causes the cam member to likewise rotate in a clockwise direction, whereupon the flat end 81a of wing 79 contacts the under surface 81 of the wedge member 33 and raises this member which in turn elevates the free end 41 of the grasshopper switch 34 a distance sufficient to cause the contacts 42 and 43 to separate. As the wedge member is locked in the raised position by the cam member 75, it is unaffected by the expansion of the bellows 24 and consequently the contacts 42 and 43 will remain separated until the rod 76 is moved counter-clockwise to restore the device to the control of the temperature-responsive device.

It is necessary to periodically suspend the operation of the refrigerating apparatus long enough to permit melting of the accumulated frost on the cooling unit. Heretofore, it has been necessary to manually stop and start the machine for the defrosting period. The present invention includes a means as hereafter described, to automatically restart the compressor and restore the apparatus to the control of the temperature responsive device when the frost has melted from the evaporator, thereby relieving the user of the necessity of watching the apparatus, after the defrosting cycle has started, to manually restart the machine before an unsafe temperature prevails in the food chamber.

This is accomplished in the present invention, by providing an irregular shaped plate 84 (Fig. 10) mounted on the shaft 66 by a slot 84' so as to be capable of moving transversely as well as rotating about the shaft.

The movement of the plate 84 is directed by a pin 86 projecting from the outer end of a rod 86' rigidly fastened at its opposite end to the base 21. The pin 86 projects through an L-shaped slot 85 formed in the plate 84.

When the pin 86 and slot 85 are in the relative positions shown in Fig. 3, the defrosting plate 84 is inoperative and performs no function.

Fig. 4 shows the device in the defrosting position with the pin 86 in the lower end of the slot 85. This position is obtained by swinging the handle 80 counter-clockwise from its central position shown in Fig. 9 to the defrosting position D. The handle 80 rotates the cam member 75 counter-clockwise, whereupon a pin 82 mounted on a wing portion 82' of the cam member, and which slides freely in an additional slot 83 formed in the plate 84, engages the upper end of this slot and bodily moves the plate counter-clockwise about the shaft 66 and upwardly to the left. The extent of this position is limited by the pin 86 engaging the lower end of the slot 85.

The portion 87 of the plate 84 thereupon engages the under surface 81 of the wedge member 33 and raises the wedge and the free end 41 of the grasshopper switch 34 a distance sufficient to cause the contacts 42 and 43 to separate. The complete defrosting position is shown in Fig. 4.

As the machine is now shut off the bellows 24 will expand in response to the increased evaporator temperature, but the switch contacts will not close when the normal temperature of from 15° to 28° Fahrenheit is reached, due to the fact that the wedge member, and consequently the free end of the grasshopper switch are mechanically locked in the raised position of Fig. 4. The bellows will, however, continue to expand in response to the increased evaporator temperature until, when a temperature corresponding to that at which all the frost will have melted from the cooling coils, and which may be approximately 40° is reached, the bell-crank lever 28 will have been rotated in a clockwise direction far enough to cause the end of arm 32 to engage an inwardly projecting pin 88 mounted on the lower lobe 88' of the plate 84 with a force sufficient to throw the plate back to the inoperative position shown in Fig. 3. This action releases the wedge member 33 and the free end of the grasshopper switch so that the contacts 42 and 43 immediately close and cause the compressor to operate. The apparatus then proceeds to function normally under the control of the temperature responsive apparatus. The defrosting features of the applicant's invention are covered by a copending divisional application, Serial No. 670,337, filed May 10, 1933 for Control apparatus.

It is a feature of the invention that both the off position and the defrosting position may be obtained regardless of the setting of the temperature selector and likewise the temperature selector may be adjusted while the apparatus is in either of these positions so as to cause the machine to operate between different temperature limits after the apparatus is restored to the control of the temperature-responsive device.

It will readily be seen that I have invented a control unit for a mechanical refrigerator which is compact, and which will maintain predetermined temperature limits in the refrigerator compartment or evaporator, which temperature limits may be varied manually. I have also provided simple and accessible means for shutting off the refrigerating apparatus either permanently or for defrosting, and also means for automatically returning the refrigerating apparatus to normal operation after a defrosting cycle is completed, the means for accomplishing these results cooperating one with the other. No extra springs or switches are necessary to perform these functions other than those used for maintaining the temperature of the refrigerator at a predetermined degree. The means for controlling the starting windings of the refrigerator motors is also part of the control and is placed in the control box where it is easily accessible.

Although I have shown and described a specific embodiment of the invention, it is understood that those skilled in the art may make modifications and changes without departing from the spirit and scope of the appended claims.

I claim as my invention:

1. In temperature control apparatus, a member having a range of movement, means for biasing the member for movement in one direction, temperature responsive means for moving the member in the other direction against the force of the biasing means, said biasing means and temperature responsive means providing an operating temperature range, means for adjusting the limits of the temperature range, a switch, an operating member for opening and closing the switch and having a range of movement at one point of which the switch is closed and at another point of which the switch is opened to provide a substantially established temperature differential, and means cooperating with the first and second members to provide for variation of timing of said temperature differential within the temperature range with respect to the range of movement of the first member.

2. In temperature control apparatus, a member having a range of movement, means for biasing the member for movement in one direction, temperature responsive means for moving the member in the other direction against the force of the biasing means, said biasing means and temperature responsive means providing an operating temperature range, means for adjusting the limits of the temperature range, a switch, an operating member for opening and closing the switch and having a set range of movement at one point of which the switch is closed and at another point of which the switch is opened to provide a substantially established temperature differential, and manually adjustable means providing for variation in timing of said temperature differential within the temperature range with respect to the range of movement of the first member.

3. In temperature control apparatus, a member having a range of movement, means for biasing the member for movement in one direction, temperature responsive means for moving the member in the other direction against the force of the biasing means, said biasing means and temperature responsive means providing an operating temperature range, means for adjusting the limits of the temperature range, a switch, an operating member for opening and closing the switch and having a range of movement at one point of which the switch is closed and at another point of which the switch is opened, and adjustable spacing means between the first and second members to provide for variation of timing of said temperature differential within the temperature range with respect to the range of movement of the first member.

4. In temperature control apparatus, a member having a range of movement, means for biasing the member for movement in one direction, temperature responsive means for moving the member in the other direction against the force of the biasing means, a switch, an operating member for opening and closing the switch and having a range of movement at one end of which the switch is closed and at the other end of which the switch is opened, a wedge element arranged between the first and second members, and means for adjusting the wedge element in order to secure variation of the range of movement of the operating member with respect to the range of movement of the first member.

5. In temperature control apparatus, a switch, a switch-operating means having a sufficient amplitude of movement to open and close the switch, a movable member operatively connected to the switch-operating means, biasing means for moving the movable member in one direction, temperature responsive means for moving the movable member in the other direction against the force of the biasing means, said biasing means and temperature responsive means providing an operating temperature range, means for adjusting the limits of the temperature range, and manual means for adjusting the switch-operating means so as to either advance or retard both its opening and closing amplitude with respect to the movement of the movable member.

6. In temperature control apparatus, a switch, a switch-operating member having a sufficient amplitude of movement to open and close the switch, a temperature responsive member operatively connected to the switch-operating member, means cooperating with the temperature responsive means to provide an operating temperature range, means for adjusting the limits of the temperature range, and means for adjusting the switch-operating member so as to either advance or retard both the opening and closing amplitude with respect to movement of the temperature-responsive member, said means including a manually movable member restrained to move in a predetermined manner to effect advancing or retarding adjustment directly in response to its movement.

7. In temperature control apparatus, a member having a range of movement, means for biasing the member for movement in one direction, temperature responsive means for moving the member in the other direction against the force of the biasing means, said biasing means and temperature responsive means providing an operating temperature range, means for adjusting the limits of the temperature range, a switch, an operating member for opening and closing the switch and having a range of movement at one point in which the switch is closed and at another point in which the switch is opened, and means cooperating with the first and second members to effect both opening and closing of the switch either earlier or later in the range of movement of the first member.

8. In temperature control apparatus, a member having a range of movement, means for biasing the member for movement in one direction, temperature responsive means for moving the member in the other direction against the force of the biasing means, said biasing means and temperature responsive means providing an operating temperature range, means for adjusting the limits of the temperature range, a switch, an operating member for opening and closing the switch and having a range of movement at one point in which the switch is closed and at another point in which the switch is opened, means cooperating with the first and second members to effect both opening and closing of the switch either earlier or later in the range of movement of the first member, and additional means for adjusting the points in the range of movement of the switch operating member at which the switch is opened and closed.

9. In temperature control apparatus, a member having a range of movement, means for biasing the member for movement in one direction, temperature responsive means for moving the member in the other direction against the force of the biasing means, said biasing means and temperature responsive means providing an operating temperature range, means for adjusting the limits of the temperature range, a switch, an operating member for opening and closing the switch and having a range of movement at one point of which the switch is closed and at another point of which the switch is opened to provide a substantially established temperature differential, and means cooperating with one of the aforesaid members to provide for variation of timing of said temperature differential.

10. In temperature control apparatus, a switch operating member having a range of movement, temperature responsive means for moving the operating member, means cooperating with the temperature responsive means to provide an operating temperature range, means for adjusting the limits of the temperature range, a switch, means responsive to movement of the operating member for opening and closing the switch, said operating member having a range of movement at one point of which the switch is closed and at another point of which the switch is opened to provide a substantially established temperature differential, and means cooperating with the operating member to adjust the angular position thereof to provide for variation of timing of said established temperature differential within said temperature range.

11. In temperature control apparatus, a pivoted lever, a spring for biasing the lever in one direction, a sylphon bellows for moving the lever in the other direction against the force of the spring member, means including the lever and the bellows for providing an operating temperature range, means for adjusting the limits of the temperature range, a switch, an operating member for opening and closing the switch, and having a range of movement at one point in which the switch is closed and another point in which the switch is opened, a switch member disposed between the lever and the switch operating member to provide an established temperature differential within the temperature range, means for moving the entire temperature differential up or down in the range including means for moving the wedge member to vary the space between the lever and the switch operating member and therefore to change the movement of the bellows necessary to effect switch operation.

12. The combination with a switch, of a tiltable member for opening and closing the switch, a lever movable in response to a change in pressure or temperature for tilting the tiltable member, means for angularly adjusting the tiltable member relative to the lever to advance or retard opening and closing of the switch relative to movement of the lever, and a means for preventing motion of the lever in the switch opening direction and opening of the switch when the adjusting means is fully advanced.

13. The combination with a switch and a switch operating member having a sufficient amplitude of movement to open and close the switch, a member movable in response to a change in pressure or temperature, and operatively connected to the switch operating member, means for adjusting the switch operating member so as to advance or retard its amplitude of opening and closing movement with respect to movement of the movable member, and means for preventing movement of said movable member in the direction of decreasing pressure or temperature and opening of the switch when the adjusting means is in the fully advanced position.

FREDERIC L. TARLETON.